United States Patent
Hehn et al.

(10) Patent No.: US 12,541,970 B2
(45) Date of Patent: Feb. 3, 2026

(54) SYSTEM AND METHOD FOR ESTIMATING THE POSE OF A LOCALIZING APPARATUS USING REFLECTIVE LANDMARKS AND OTHER FEATURES

(71) Applicant: Verity AG, Zürich (CH)

(72) Inventors: Markus Hehn, Zürich (CH); Lino Widmer, Zürich (CH)

(73) Assignee: VERITY AG, Zürich (CH)

( * ) Notice: Subject to any disclaimer, the term of this patent is extended or adjusted under 35 U.S.C. 154(b) by 373 days.

(21) Appl. No.: 18/270,420

(22) PCT Filed: Dec. 13, 2021

(86) PCT No.: PCT/IB2021/061640
§ 371 (c)(1),
(2) Date: Jun. 29, 2023

(87) PCT Pub. No.: WO2022/144655
PCT Pub. Date: Jul. 7, 2022

(65) Prior Publication Data
US 2024/0135703 A1    Apr. 25, 2024

Related U.S. Application Data

(60) Provisional application No. 63/132,209, filed on Dec. 30, 2020.

(51) Int. Cl.
*G06V 20/17*    (2022.01)
*G06T 7/593*    (2017.01)

(52) U.S. Cl.
CPC ............. *G06V 20/17* (2022.01); *G06T 7/593* (2017.01); *G06T 2207/30204* (2013.01)

(58) Field of Classification Search
CPC ............. G06V 20/17; G06T 7/593; G06T 2207/30204; G06T 2207/10032;
(Continued)

(56) References Cited

U.S. PATENT DOCUMENTS

2011/0044504 A1    2/2011   Oi et al.
2019/0219401 A1*   7/2019   Daniilidis .......... G01C 21/1656
(Continued)

FOREIGN PATENT DOCUMENTS

CN    106989746 A    7/2017
JP    2003266349 A   9/2003
(Continued)

OTHER PUBLICATIONS

International Search Report and Written Opinion for PCT/IB2021/061640, dated Mar. 21, 2022, 9 pages.
(Continued)

*Primary Examiner* — Vu Le
*Assistant Examiner* — Rachel Anne Ometz
(74) *Attorney, Agent, or Firm* — Blank Rome LLP (57) ABSTRACT

The invention relates to a method for determining a state $x_k$ of a localizing apparatus at a time t. the state $x_k$ being a realization of a state random variable $x_k$. The position and orientation of a camera, e.g., mounted on a drone as an example of a localizing apparatus, may be used for determining a state of the localizing apparatus, and the state may be tracked over time. Existing methods for determining the state of a localizing apparatus do not provide an adequate level of accuracy, however, thus making them insufficient for use in many applications. It is an object of the present invention to mitigate at least some of the disadvantages associated with the methods for determining a state $x_k$ of a localizing apparatus known from the state of the art.

15 Claims, 2 Drawing Sheets

(58) Field of Classification Search
CPC .......... G06T 2207/30244; G06T 7/579; G05D 1/102; G05D 1/46; G01C 21/206
See application file for complete search history.

(56) References Cited

U.S. PATENT DOCUMENTS

| 2020/0158517 | A1* | 5/2020 | Tadi | G06T 7/248 |
| 2022/0043458 | A1 | 2/2022 | Wang | |

FOREIGN PATENT DOCUMENTS

| JP | 2007257226 A | 10/2007 |
| JP | 2011043419 A | 3/2011 |
| JP | 20200056757 A | 4/2020 |
| WO | WO-2020/160459 A1 | 8/2020 |

OTHER PUBLICATIONS

Office Action for Japanese Application No. 2023-535398, mailed Jan. 15, 2025, with English language translation, 6 pages.
Song Feng, SLAM Global Positioning Algorithm Based on Laser and Vision Fusion, 2020 International Conference on Computer Science and Management Technology (ICCSMT), US, IEEE, Nov. 20, 2020, p. 9-p. 15.
Anderson et al., Book Cover for "Optimal Filtering", Dover Publications (2005), 2 pages.
Anderson et al., Optimal Filtering, "Filtering, Linear Systems, and Estimation", Chapter 2, Section 2.2 The Gauss-Markov Discrete-Time Model, pp. 18-19, Dover Publications (2005).
Simon, Book Cover for "Optimal State Estimation", John Wiley & Sons, Inc. (2006), 3 pages.
Simon, Optimal State Estimation, "Propagation of States and Covariances", Chapter 4, Section 4.1, Discrete-Time Systems, pp. 108-109, John Wiley & Sons, Inc. (2006).

* cited by examiner

SYSTEM AND METHOD FOR ESTIMATING THE POSE OF A LOCALIZING APPARATUS USING REFLECTIVE LANDMARKS AND OTHER FEATURES

RELATED APPLICATIONS

This application is a national phase of PCT/IB2021/061640, filed on Dec. 13, 2021, which claims priority to U.S. Provisional Application No. 62/132,209, filed on Dec. 30, 2020. The contents of these applications are hereby incorporated by reference in their entirety.

FIELD OF THE INVENTION

The present invention relates to a method for determining a state $x_k$ of a localizing apparatus at a time $t_k$, and to a computer program product and an assembly.

BACKGROUND TO THE INVENTION

Indoor navigation of robots, for example drones, is an important problem, e.g., in the field of automatic warehousing. Such robots are localizing agents. To facilitate indoor navigation, the robot, e.g., the drone, needs to know its current position with respect to its environment. Contrary to outdoor environments in which GNSS (Global Navigation Satellite Systems) can be employed, providing a high localization accuracy, GNSS in indoor environments is often not reliable due to signal attenuation and multi-path effects. Existing RF localization technologies for indoor and outdoor spaces also struggle with signal attenuation and multipath effects limiting the usability in complex environments, for instance, in the presence of a significant amount of metal.

In the prior art, optical localization systems for indoor localization are known. Such optical localization systems extract information from images captured by a camera. The location of an object of which the pose is to be determined can then be computed using triangulation techniques after relating the coordinates of features in the two-dimensional camera image to three-dimensional rays corresponding to said features. The relation between image coordinates and three-dimensional rays is typically captured in a combination of first-principle camera models (such as pinhole or fisheye camera models) and calibrated distortion models (typically capturing lens characteristics, mounting tolerances, and other deviations from a first-principle model).

In optical localization systems for determining the location of a localizing apparatus known in the prior art, the camera can be rigidly mounted outside the localizing apparatus, observing the motion of the localizing apparatus ("outside-in tracking"), or the camera can be mounted on the localizing apparatus itself observing the apparent motion of the environment ("inside-out tracking"). While outside-in tracking localization systems typically determine the location of the localizing apparatus relative to the known locations of the camera(s), inside-out tracking systems like SLAM (Simultaneous Localization and Mapping) typically generate a map of the environment in which the localizing apparatus moves. The map is expressed in a coordinate system that can be related to an external coordinate system in case the locations of at least parts of the environment are already known with respect to the external coordinate system or if the initial pose of the camera is known with respect to the external coordinate system. In both cases, some error will accumulate as the map is expanded away from the initial field of view of the camera or from the parts of the environment with known location. The potential for propagating errors is a problem for applications where the location information must be referred to external information, for example to display the location of the localizing apparatus in a predefined map, to relate it to the location of another such localizing apparatus, or when the location is used to guide the localizing apparatus to a location known in an external coordinate system.

Outside-in optical localization systems typically scale very poorly to larger localization systems because at every point, the localizing apparatus must be seen by several cameras in order to triangulate the 3D position of the localizing apparatus. Especially for large spaces where only few localizing apparatus are tracked this is economically not viable.

The position and orientation of a camera, e.g., mounted on a drone as an example of a localizing apparatus, may be used for determining a state of the localizing apparatus, and the state may be tracked over time. Existing methods for determining the state of a localizing apparatus do not provide an adequate level of accuracy, however, thus making them insufficient for use in many applications.

It is an object of the present invention to mitigate at least some of the disadvantages associated with the methods for determining a state $x_k$ of a localizing apparatus known from the state of the art.

SUMMARY OF THE INVENTION

According to a first aspect of the present invention there is provided a method for determining a state $x_k$ of a localizing apparatus, involving the steps recited in claim 1. Further optional features and embodiments of the method of the present invention are described in the dependent patent claims.

The invention relates to a method for determining a state $x_k$ of a localizing apparatus at a time $t_k$, the state $x_k$ being a realization of a state random variable $\mathbf{x}_k$. The method comprises the following steps: a) receiving a first image of a scene of interest in an indoor environment, wherein the indoor environment comprises N pre-arranged landmarks having known positions in a world coordinate system, N being a natural number; b) receiving a second image of a scene of interest in the indoor environment; c) receiving a state estimate $\widehat{x_k}$, of the localizing apparatus at the time $t_k$; d) receiving positions of n currently mapped simultaneous-localization-and-mapping (SLAM) landmarks in the scene of interest, wherein a map state $s_k$ comprises at least (i) the state $x_k$ of a localizing apparatus, (ii) the positions of the n currently mapped SLAM landmarks, and (iii) the positions of the N pre-arranged landmarks; e) determining positions of M features in the first image, M being a natural number smaller than or equal to N, and determining an injective mapping estimate from the M features into the set of N pre-arranged landmarks; f) determining positions of L SLAM features in the second image, and determining m SLAM features in the L SLAM features, wherein said m SLAM features are related to the n currently mapped SLAM landmarks, and determining a SLAM injective mapping estimate from the m SLAM features into the set of the n currently mapped SLAM landmarks; g) using the determined injective mapping estimate and the determined SLAM injective mapping estimate to set up a joint observation model as part of a state-space model, wherein the joint observation model is configured to map a map state random variable $\mathbf{s}_k$ of which the map state $s_k$ is a realization onto a joint observation random variable 4, wherein at the time $t_k$, an observation $z_k$ is a realization of the joint observation random variable 4, and wherein the observation comprises the position of at least one of the M features in the first image and the position of at least one of the m SLAM features in the second image; and h) using (i) the state estimate $\widehat{x}_k$, (ii) the joint observation model, and (iii) the observation $z_k$, to determine the state $x_k$ of the localizing apparatus at the time $t_k$ and to update the positions of the n currently mapped SLAM landmarks.

Simultaneous localization and mapping (SLAM) comprises three fundamental operations. A suitable combination of these three fundamental operations may provide a SLAM solution as discussed in the following.

The first fundamental operation of SLAM is to model a movement of the localizing apparatus through the indoor environment. A mathematical model of such a movement through the indoor environment may be termed motion model. Instead of or in addition to such a motion model, an inertial measurement unit may also be used. Since a movement of the localizing apparatus through the indoor environment is noisy and prone to error, the motion model may take account of such an uncertainty due to noise and error. Each movement of the localizing apparatus through the indoor environment therefore may increase uncertainty of a position of the localizing apparatus in the indoor environment. The motion model may be embodied as a function taking the current state of the localizing apparatus, a control signal and a perturbation as input and providing a new state of the localizing apparatus as output. The new state of the localizing apparatus may, e.g., be an estimate of a new position which the localizing apparatus is moving to.

The second fundamental operation of SLAM comprises determining positions of SLAM landmarks in the indoor environment from image(s) of scene(s) of interest in the indoor environment. A SLAM feature detector, e.g., embodied as edge detector, corner detector or SIFT feature detector, may be applied to image(s) of the indoor environment: this way, SLAM features are detected in image(s) of the indoor environment. Such SLAM features detect projections of SLAM landmarks into an image of the indoor environment. To determine positions of SLAM landmarks from images of the indoor environment, an inverse observation model may be needed. Such an inverse observation model may be used for initialization purposes as explained later, initialization referring to the case of detecting a new SLAM landmark which has not been detected in previous iterations of the SLAM algorithm. The inverse observation model may be embodied as a function taking the current state of the localizing apparatus and a measured (position of a) SLAM feature as input and providing an estimate of the position of a SLAM landmark corresponding to the measured SLAM feature as output. Since a 2D image of a SLAM landmark which has a 3D position in the indoor environment typically does not provide enough information for determining the 3D position of the SLAM landmark (a depth camera, e.g., embodied as a time-of-flight camera, may, however, provide sufficient information for determining the 3D position of the SLAM landmark), either additional knowledge is needed—e.g., in the form of a prior which is provided as additional input to the inverse observation model—or at least two distinct images of a SLAM landmark need to be taken: in the latter case, a 3D position of the SLAM landmark may be obtained using triangulation, and the inverse observation model may take two states of the localizing apparatus and two measured SLAM features as input. For triangulation to be possible, SLAM features may need to be tracked over at least distinct two images. Methods to initialize newly discovered SLAM landmarks are well known in the prior art.

The third fundamental operation of SLAM comprises taking care of determined SLAM features which correspond to SLAM landmarks which have already been detected in previous iterations of the SLAM algorithm. The third fundamental operation is primarily concerned—based on a newly acquired image of the scene of interest—with updating the state of the localizing apparatus and with updating positions of those SLAM landmarks which have been detected in previous iterations of the SLAM algorithm. To carry out the third fundamental operation of SLAM, a direct observation model (also termed observation model) may be used, wherein said observation model predicts positions of SLAM features in an image based on a current state of the localizing apparatus and a current estimate of the positions of previously detected SLAM landmarks. The observation model may be embodied as a function taking the current state of the localizing apparatus and a current estimate of the position of a SLAM landmark as input and providing the position of a SLAM feature as output. The direct observation model and the indirect observation model may be inverses of one another.

Together with an estimation algorithm, e.g., an extended Kalman filter (EKF), the three fundamental operations may be used to construct a SLAM algorithm. A SLAM algorithm based on an EKF may operate on a map state which comprises the state of the localizing apparatus and the positions of the SLAM landmarks which have been already detected: these already detected SLAM landmarks may be termed currently mapped SLAM landmarks; at an iteration of the SLAM algorithm, n such currently mapped SLAM landmarks may be given which have been determined in previous iterations. The map state used by the SLAM algorithm may therefore grow over time once new SLAM landmarks are detected. The map state may also shrink: a SLAM algorithm may be implemented in such a way that in case a SLAM landmark has not been re-observed in a pre-set (or dynamically adapted) amount of time, or in case only limited memory is available for storing SLAM landmarks, SLAM landmarks may be deleted from the map state. In a first iteration of the SLAM algorithm, the map state may comprise only an initial value assignment to the state of the localizing agent, and no positions of previously detected SLAM landmarks may be part of the map state.

In each iteration of an EKE-SLAM algorithm, the following operations may therefore be performed: a prediction step, a correction step, and an initialization step. In the prediction step, a mean and covariance matrix of the map state may be changed based on the motion model. In the correction step, SLAM features corresponding to previously determined SLAM landmarks (each detected SLAM feature may have a unique signature—a signature of a detected SLAM feature may therefore be compared to signatures of previously detected SLAM features to determine if the detected SLAM feature corresponds to a SLAM landmark which has already been observed) are used in update equations provided by the EKF to update the state of the localizing agent and to update the positions of n currently mapped SLAM landmarks (it is assumed that in the considered iteration of EKE-SLAM, n SLAM landmarks were previously observed). The update equations in EKE-SLAM, also termed correction equations, are based on the (direct) observation model. The update equations as part of the correction step may be applied to the output of the prediction step. In the initialization step, SLAM features corresponding to SLAM landmarks which have not been previously observed may be used for growing the map state. To determine the position of a SLAM landmark from a detected SLAM feature, the indirect observation model may be used, wherein said indirect observation model also takes as input a current state (which may be obtained, e.g., after the prediction step) of the localizing agent (which may be assumed to have a fixed geometric relationship to a camera acquiring the image in which the SLAM feature for growing the map state is detected).

In the method according to the invention, the map state $s_k$ also comprises the positions of N pre-arranged landmarks in the indoor environment. The positions of the N pre-arranged landmarks in the indoor environment are known. The map state therefore comprises both state information needed for SLAM such as the state of the localizing agent and the positions of currently mapped SLAM landmarks, but also positions of pre-arranged landmarks which do not need to be estimated and tracked over time. A first camera imaging a scene of interest in the indoor environment may capture a first image in which at least a subset, the subset being nonempty, of the N pre-arranged landmarks is visible, and a second camera imaging a scene of interest in the indoor environment may capture a second image. The first image and the second image may comprise update information for determining/updating the state of the localizing apparatus. A first camera capturing the first image and a second camera capturing the second image may be embodied as depth cameras, event cameras or conventional cameras. Applying a SLAM feature detector, e.g., a scale-invariant feature transform (SIFT) detector, or a speeded up robust features (SURF) detector, or any other known feature detector suitable for SLAM and known from the prior art to the second image may provide SLAM features in the second image. Alternatively, both the first image and the second image may be captured by a same camera, e.g., the first camera. The first image and the second image may also coincide, i.e., one image may be both the first image and the second image.

Through a determined injective mapping estimate, M determined features in the first image may be mapped into the set of N pre-arranged landmarks. An analogue SLAM injective mapping estimate maps m SLAM features into the set of the n currently mapped SLAM landmarks (these m SLAM features correspond to SLAM landmarks which have been previously already observed). The joint observation model describes the mapping of the map state into/onto a set of observations, the observations comprising the positions of the M determined features in the first image and the positions of the m determined SLAM features in the second image. The joint observation model may comprise a first observation model and a SLAM observation model performing the respective mappings. In case the first image and the second image are captured by different cameras, the first observation model and the SLAM observation model may model a mapping of the respective scenes of interest onto different image planes of the different cameras, respectively. The joint observation model is used in the method according to the invention for updating/correcting the state of the localizing agent and for updating/correcting the positions of the n currently mapped SLAM landmarks, e.g., after a prediction step. The state $x_k$ of the localizing apparatus and the positions of the n currently mapped SLAM landmarks are updated based on at least one of the determined positions of the M features and on at least one of the determined m SLAM features, e.g., using update equations (correction equations) provided by an EKF.

L—m SLAM features may correspond to SLAM landmarks which were not determined in previous iterations. The positions of such newly discovered SLAM landmarks—obtained using an inverse observation model—may be used for growing the map state.

In the method according to the invention, (images of) the N pre-arranged landmarks in the indoor environment are therefore also used for updating the positions of the n currently mapped SLAM landmarks in the scene of interest. Since the positions of the N pre-arranged landmarks may be known with great accuracy, such an information flow from the N pre-arranged landmarks to the n currently mapped SLAM landmarks may help reduce an accumulation of errors in both the state of the localizing apparatus and in the (estimated) position of the n currently mapped SLAM landmarks.

The method according to the invention may therefore be seen as part of a SLAM algorithm operating in an environment with pre-arranged landmarks with known positions. Using the method according to the invention as part of a SLAM algorithm, said pre-arranged landmarks are used for correcting possible errors accumulated by the SLAM algorithm during its runtime. Besides fusing measurements of the pre-arranged landmarks with SLAM measurements during runtime of the iterative SLAM algorithm, measurements of the pre-arranged landmarks may also be used for initializing a SLAM algorithm before the SLAM algorithm starts operating: in this case, a first map state may be initialized with a first state of the localizing apparatus—wherein said first state is determined using image(s) of the pre-arranged landmarks—and with the positions of the pre-arranged landmarks. In case that the first state is not determined using image(s) of the pre-arranged landmarks, the first state may be initialized with arbitrary values, e.g., set to zero. Initializing the first state with information obtained from the pre-arranged landmarks may provide absolute position information (with respect to a world coordinate system in which the positions of the pre-arranged landmarks are known) to the subsequently operating SLAM algorithm so that the SLAM algorithm may build up a map of the environment which is indirectly referenced to the word coordinate system. Drifts of the SLAM algorithm are subsequently corrected using the method according to the invention. In case that no pre-arranged landmarks are visible, e.g., in case the localizing apparatus is too close to a ceiling in the scene of interest on which ceiling the pre-arranged landmarks are arranged, the method according to the invention may fall back on conventional SLAM as known from the prior art.

Alternatively, the estimation of the state of the localizing apparatus may proceed independently, i.e., two estimates of the state of the localizing apparatus may be determined in parallel: a first estimate of the state of the localizing apparatus may be obtained using only image(s) of the pre-arranged landmarks, and a second estimate of the state of the localizing apparatus (plus a growing set of SLAM landmarks in the indoor environment) may be obtained through a conventional SLAM algorithm. If the two estimates of the state of the localizing apparatus are not within some threshold of each other, the currently constructed SLAM landmark map comprising the currently mapped SLAM landmarks may be discarded and re-initialized. The first estimate of the state of the localizing apparatus may be used to provide loop-closure for the conventional SLAM algorithm, i.e., when arriving at a state where the localizing apparatus previously was in a previous iteration, this information may be used for informing the SLAM algorithm that it should expect to see the same SLAM landmarks which it already saw in the previous iteration. Such informing of the SLAM algorithm may be achieved by, e.g., lowering a threshold for a signature comparison of two features so that they are considered a match, i.e., the same feature.

In an embodiment of the method according to the invention, the first image and the second image are captured at the same time $t_k$.

The first image and the second image may be captured at the same time $t_k$. This may be beneficial as in this case processing of the first image and of the second image may occur concurrently. In case the two images would be captured a different times, updating of the map state could proceed in two steps: in a first updating step, e.g., based on the image captured first, an intermediate update of the map state may be determined based on the information in the image captured first; this intermediate map step may then be updated based on the motion model, which may be used to propagate the intermediate update of the map state in time to the time at which the image captured second is captured, and based on information determined from the image captured second. If the first image and the second image are not captured at the same time, one or both images can also be algorithmically shifted in time so that the two images align temporally: such algorithmic time shifting may, e.g., be based on interpolation or extrapolation techniques applied to sequences of first images (captured by the first camera over time) and/or sequences of second images (captured by the second camera over time).

In a further embodiment of the method according to the invention, the joint observation model comprises a first observation model describing the mapping of the at least one of the N pre-arranged landmarks, corresponding to the at least one of the M features via the injective mapping estimate, onto the position of the at least one of the M features, and the joint observation model comprises a SLAM observation model describing the mapping of the at least one of the n currently mapped SLAM landmarks, corresponding to the at least one of the m SLAM features via the SLAM injective mapping estimate, onto the position of the at least one of the m SLAM features.

In a further embodiment of the method according to the invention, the injective mapping estimate, subsequently termed IME, links the M features with the M pre-assigned landmarks, and the SLAM injective mapping estimate, subsequently termed SLAM-IME, links the m SLAM features with the m SLAM landmarks, wherein, for a feature i of the M features, the corresponding landmark is landmark IME(i), and wherein for a feature j of the m SLAM features, the corresponding SLAM landmark is SLAM landmark SLAM-IME(j), and wherein, for a feature-landmark pair (i,IME(i)) and for a SLAM feature/SLAM landmark pair (j,SLAM-IME(j)), the joint observation model links an observation random variable $z_{k,i}$, resp. $z_{k,j}$, wherein the joint observation random variable $z_k$ comprises the observation random variable $z_{k,i}$ resp. $z_{k,j}$ to the state random variable $x_k$ and the position of landmark POS(IME(i)) resp. SLAM landmark POS(SLAM-IME(j),k): $z_{k,i}=h_1(x_k,POS(IME(i)))$, i=1, . . . , M, and $z_{k,j}=h_{SLAM}(x_k,POS(SLAM-IME(j),k))$, j=1, . . . , m, wherein $h_1(\cdot)$ is the first observation model and $h_{SLAM}(\cdot)$ is the SLAM observation model.

The position of SLAM landmark POS(SLAM-IME(j),k) changes in general over time. The position of SLAM landmark POS(SLAM-IME(j),k) is therefore dependent on index k as well.

In a further embodiment of the method according to the invention, a priori known positions in the world coordinate system of S SLAM landmarks are provided, wherein said S SLAM landmarks are associated to a pre-set SLAM feature detector whose application to the second image provides the L SLAM features, and wherein an association between the S SLAM landmarks and respective feature signatures, as well as the feature signatures themselves, are provided, said feature signatures being related to an output provided by the application of the pre-set SLAM feature detector to an image of said S SLAM landmarks, wherein the method additionally comprises the following: 1) determining t of the L SLAM features related to the S SLAM landmarks with a priori known position by comparing the feature signatures of the L SLAM features to the feature signatures in the association; 2) as part of the determining of the SLAM injective mapping estimate, setting up an injective mapping from the t SLAM features to the corresponding SLAM landmarks based on the comparing of the feature signatures of the L SLAM features to the feature signatures in the association. In principle, t may be equal to any natural number between '0' (no SLAM feature determined with corresponding SLAM landmark having a priori known position in the world coordinate system) and L, the latter case corresponding to the situation in which all determined L SLAM features have corresponding SLAM landmarks with a priori known positions in the world coordinate system.

In a further embodiment of the method according to the invention, the n currently mapped SLAM landmarks comprise only SLAM landmarks with a priori unknown position in the world coordinate system. The determined SLAM features with corresponding SLAM landmarks with a priori known position in the world coordinate system may be used for determining the state $x_k$ of the localizing apparatus and for determining the positions of the SLAM landmarks with a priori unknown position in the world coordinate system.

In a further embodiment of the method according to the invention, the M features related to the N pre-arranged landmarks are substantially indistinguishable from one another, and the indoor environment comprises K additional landmarks with a priori unknown positions in the world coordinate system, wherein H≤K additional landmarks of the K additional landmarks are in the scene of interest and wherein currently estimated positions of P of the K additional landmarks are part of the map state $s_k$, and wherein the H additional landmarks are captured in the first image as additional features which are substantially indistinguishable from the M features, wherein the method additionally comprises the following: 1) determining, jointly with the determining of the positions of the M features, positions of the H additional features, wherein the determining thereby provides M+H positions of the features and of the additional features in the first image; 2) separating the positions of the M+H features and additional features into a first set comprising M+R positions, with R≤P, and into a second set comprising Q positions, with H=R+Q; 3) determining the injective mapping estimate from the first set into an indistinguishable landmark set comprising the positions of the N pre-arranged landmarks and the P currently estimated positions; and 4) updating (augmenting) the map state $s_k$ based on the second set. This embodiment of the method according to the invention may also be combined with the embodiments of the method according to the invention comprising the S SLAM landmarks with a priori known positions in the world coordinate system.

The N pre-arranged landmarks may be indistinguishable from one another. For example, the N pre-arranged landmarks may be embodied as retroreflectors of a same type and build. Projections of the pre-arranged landmarks into the first image, the projections being features, may therefore be substantially indistinguishable from one another, i.e., it may, by inspecting at a time only one feature in the first image and disregarding other features in the first image, not be unambiguously decided which pre-arranged landmark the inspected feature corresponds to. Besides the N pre-arranged landmark, K additional landmarks may be present in the indoor environment as well, and the K additional landmarks may be indistinguishable from the N pre-arranged landmarks. Alternatively, only the additional features corresponding to additional landmarks may be indistinguishable from the features corresponding to the pre-arranged landmarks. The number assigned to variable K may be known or unknown. It therefore may not be known how many additional landmarks are in the indoor environment. Initially, positions of the K additional landmarks may not be known in the world coordinate system, contrary to the a priori known positions of the N pre-arranged landmarks in the world coordinate system. In the scene of interest of the indoor environment captured by the first image, H≤K additional landmarks may be captured as H additional features, and it may be assumed without loss of generality that said H additional features may be identifiable from the first image in a robust and stable manner. In total, there may be therefore M+H features and additional features in the first image, corresponding to (a subset of the) N+K pre-arranged landmarks and additional landmarks.

The map state $s_k$ may additionally comprise currently estimated positions of P of the K additional landmarks. The currently estimated positions of P additional landmarks may have been determined in previous iterations of an algorithm in which the method according to the invention may be embedded as previously described. As such, even though a priori positions of the additional landmarks may be unknown, these positions may be estimated over time so that at a specific iteration of the overall algorithm, say iteration k, positions of P additional landmarks may have been previously estimated, implying that from the N+K landmarks and additional landmarks, the positions of N+P landmarks and additional landmarks in the world coordinate system may be known, and the positions of K−P additional landmarks may still be unknown, provided K is known.

The M+H observed positions of features and additional features may be separated into a first set comprising those features and additional features that correspond to landmark and additional landmarks with known (or currently estimated) position in the world coordinate system, and into a second set comprising those additional features that correspond to additional landmarks with currently unknown position in the world coordinate system. The injective mapping estimate may then be determined from the first set into an indistinguishable landmark set comprising the (a priori known) positions of the N pre-arranged landmarks and the P currently estimated positions of P additional landmarks.

The second set may comprise additional features which correspond to additional landmarks whose position has not been previously estimated. The second set may therefore form a basis for initialization, i.e., for adding estimated positions of additional features corresponding to the second set to the map state $s_k$. Based on the second set, the map state $s_k$ may therefore be augmented. The required information for estimating a position of an additional feature in the world coordinate system may be obtained by using additional sensors, e.g., a depth camera, or by suitably linking additional features across a plurality of images acquired by the first camera and triangulating based on such established relationships.

The features corresponding to the pre-arranged landmarks and the additional features corresponding to previously initialized additional landmarks, with a priori unknown positions but a posteriori estimated positions, may therefore be treated in the same way, i.e., a same algorithm for injective mapping estimate estimation may be applied to the elements of the first set; the additional features corresponding to previously not initialized additional landmarks may be initialized, i.e., the map state $s_k$ may be grown.

The first set may comprise M+R elements, wherein M of these elements may relate to features corresponding to pre-arranged landmarks, and R≤P of these elements may relate to features corresponding to additional landmarks which have been previously initialized. The second set may have Q elements, with H=R+Q.

In a further embodiment of the method according to the invention, the first image is captured by a first camera with a first camera center and a first image sensor, wherein a first camera center position in the world coordinate system is determined based on the state estimate $\widehat{x_k}$, and wherein the separating proceeds by carrying out the following steps for each element in the set of M+H positions, the M+H positions being 2D positions measured in a coordinate system of the first image sensor: (i) determining a ray having as initial point the first camera center and as further point a 3D position corresponding to the 2D position of the respective element, wherein the 3D position is determined based on the state estimate $\widehat{x_k}$ and a known spatial relationship between the localizing apparatus and the first image sensor, and (ii) assigning the respective element to the first set if any landmark in the indistinguishable landmark set, measured by way of orthogonal projection onto the respective ray, is closer to the respective ray than a pre-set distance threshold, and otherwise assigning the respective element to the second set. Instead of measuring closeness to the respective ray using a pre-set distance threshold, a threshold may also be chosen which depends on an estimated uncertainty of the state, and/or the threshold may also be a function of distance away from the camera, e.g., the threshold may increase with increasing distance from the camera.

Separating the M+H features and additional features into the first set and the second set may proceed by geometrical means. Given a current estimate of a pose of the first camera capturing the first image in the world coordinate system (such a current estimate of the pose of the first camera may be obtained based on the state estimate $\widehat{x_k}$ of the localizing apparatus and a known arrangement of the first camera on the localizing apparatus, for example), a position in the world coordinate system of a first camera center may be determined (the first camera may, for example, be mathematically described as a projective mapping device), and the 2D position of a feature/additional feature in an image sensor of the first camera (this 2D position may be described in a coordinate system of the image sensor) may be translated into a 3D position in the world coordinate system by way of the determined current pose of the first camera and the known (internal) structure of said first camera. The state estimate $\widehat{x_k}$ may also be determined based on movement information provided by an inertial measurement unit arranged on the localizing apparatus. A ray may then be determined, with the initial point corresponding to the first camera center and a further point, through which the ray passes, being the estimated 3D position of the feature/additional feature. The considered feature/additional feature may be placed into the first set if any of the elements of the indistinguishable landmark set comes sufficiently close to the ray, "sufficient closeness", e.g., being measured by a threshold and orthogonal projection onto the ray. The threshold may be a parametrized function of distance along the ray, or the threshold may be a constant. In case the threshold is embodied as a constant, the selection criterion determining whether a feature/additional feature belongs to the first set may therefore reduce to a determination of whether a point in space (a position of a pre-arranged landmark or of a currently estimated additional landmark) lies inside a cylinder around the ray with radius corresponding to the constant threshold. To capture increasing uncertainty with distance from the camera, the selection criterion determining whether a feature/additional feature belongs to the first set may alternatively be embodied as determining whether a point in space (a position of a pre-arranged landmark or of a currently estimated additional landmark) lies inside a conical frustum around the ray.

In a further embodiment of the method according to the invention, the observation additionally comprises the position of at least one of the R additional features in the first image, and together with the updating of the positions of the n currently mapped SLAM landmarks the P currently estimated positions of additional landmarks are updated. The P currently estimated positions of additional landmarks may, however, also be updated based on observed features corresponding to pre-arranged landmarks with a priori known positions and/or based on observed SLAM features.

Since the P currently estimated positions of additional landmarks are only estimates, these positions may also be updated, together with the position of the n currently mapped SLAM landmarks.

In a further embodiment of the method according to the invention, the first observation model additionally describes the mapping of the at least one of the R additional landmarks, corresponding to the at least one of the R additional features via the injective mapping estimate, onto the position of the at least one of the R additional features.

In a further embodiment of the method according to the invention, the determining of the state $x_k$ using (i) the state estimate $\widehat{x_k}$, (ii) the joint observation model, and (iii) the observation $z_k$, is done by using update equations provided by applying an extended Kalman filter to the state-space model, wherein the update equations comprise the Jacobian matrix of the joint observation model, wherein the Jacobian matrix of the first observation model is evaluated at the state estimate $\widehat{x_k}$, and wherein the Jacobian matrix of the SLAM observation model is evaluated at at least the state estimate $\widehat{x_k}$, and at the positions of the n currently mapped SLAM landmarks.

In a further embodiment of the method according to the invention, the update equations corresponding to all M features and all m SLAM features are consecutively and independently invoked.

In a further embodiment of the method according to the invention, the first image is captured by the first camera as a light source is operated to emit light which illuminates the scene of interest. The second image may also be captured by a second camera as a light source is operated to emit light which illuminates the scene of interest. The light source used during capturing of the first image and the light source used during capturing of the second image may be a same light source.

According to a further aspect of the present invention there is provided a computer program product comprising instructions which when executed by a computer, cause the computer to carry out a method according to the invention.

According to a further aspect of the present invention there is provided an assembly, comprising (a) a localizing apparatus, (b) a first camera mounted on the localizing apparatus, (c) a plurality of pre-arranged landmarks in an indoor environment, and (d) a controller, wherein the controller is configured to carry out a method according to the invention.

The first camera may be configured to provide the first image. The first camera may also provide the second image, and the first image and the second image may also coincide. The first camera may be embodied as RGB-IR (red-green-blue-infrared) camera, wherein an RGB channel may provide the first image or the second image, and an IR channel may provide the other image. The first camera may also be embodied as providing high dynamic range (HDR) images. The method according to the invention may determine the state of the localizing apparatus through a known geometric relationship between a local coordinate system of the localizing agent and a first camera coordinate system of the first camera: a known coordinate transformation between the local coordinate system and the first camera coordinate system may be used for mapping a state of the first camera onto a state of the localizing apparatus.

In an embodiment of the assembly according to the invention, a second camera is arranged on the localizing apparatus, wherein the first camera is arranged on the localizing apparatus in such a way that a ceiling of the indoor environment is in the field of view of the first camera, wherein a camera axis of the first camera is in the first camera's field of view, and the second camera is arranged on the localizing apparatus in such a way that the second camera's camera axis is substantially orthogonal to the camera axis of the first camera. The camera axis of the first camera may be defined by a projection center of the first camera and a center of the first camera's image sensor, and the camera axis of the second camera may be defined by a projection center of the second camera and a center the second camera's image sensor, for example. Preferably the first camera is therefore arranged on the localizing apparatus such that the ceiling of the indoor environment is in the field of view of the first camera; and the second camera is arranged on the localizing apparatus in such a way that the second camera's camera axis is substantially orthogonal to the camera axis of the first camera. More preferably the first camera is arranged on the localizing apparatus in such a way that the ceiling is in the field of view of the first camera when the first image is being captured by the first camera, and the second camera is arranged on the localizing apparatus in such a way that the second camera's camera axis is substantially orthogonal to the camera axis of the first camera. The first camera and the second camera may therefore be arranged in such a way on the localizing apparatus that their respective field of views are substantially different from each other.

A drone or a mobile land-based robot are exemplary embodiments of a localizing apparatus. A normal movement condition of such a localizing apparatus is horizontal movement with respect to a ground surface of the scene of interest, either in air (as in case of a drone) or on the ground surface itself (as in case of a land-based robot). The N pre-arranged landmarks may be arranged on a ceiling in the scene of interest. In such a normal movement condition, the camera may be arranged on the localizing apparatus in such a way that the first camera's camera axis points towards the ceiling of the indoor environment. The first camera may be positioned in such a way on the localizing apparatus that during the capturing of the first image by the first camera a dot (inner) product between the first camera's camera axis and a vector of gravity provides a negative result; the first camera's camera axis may be within a cone of 45 degrees (an axis of the cone may be aligned with a vector of gravity and may be pointing in an opposite direction—the axis of the cone points from the cone's apex to its base—compared to the vector of gravity, i.e., the axis of the cone may point away from a ground of the indoor environment) around the vector of gravity at the time of the capturing of the first image by the first camera. SLAM landmarks, on the other hand, may typically be found within the scene of interest itself, as typical SLAM features may be determined based on strong local contrasts, for example. A ceiling of a room, for example, the ceiling of a room being a scene of interest, is on the other hand typically quite homogeneous: few SLAM features would therefore typically be detected on a ceiling of an indoor room. The first camera may therefore be positioned in such a way on the localizing agent that during the normal movement condition the first camera points upward towards the ceiling, i.e., that it mostly captures images of the ceiling. The second camera may be positioned in such a way on the localizing agent that it mostly captures images of the interior of the indoor environment. A camera axis of the second camera may therefore be oriented in a substantially orthogonal way to the first camera's camera axis.

In a further embodiment of the assembly according to the invention, the assembly comprises a light source, wherein the light source is arranged on the localizing apparatus, and/or at least one additional landmark. At least one additional landmark may also be arranged in the indoor environment with a priori unknown position; for example, during arranging of the at least one additional landmark in the indoor environment, a position of said at least one additional landmark may not have been recorded. Additional landmarks may, however, also be naturally present in the indoor environment.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
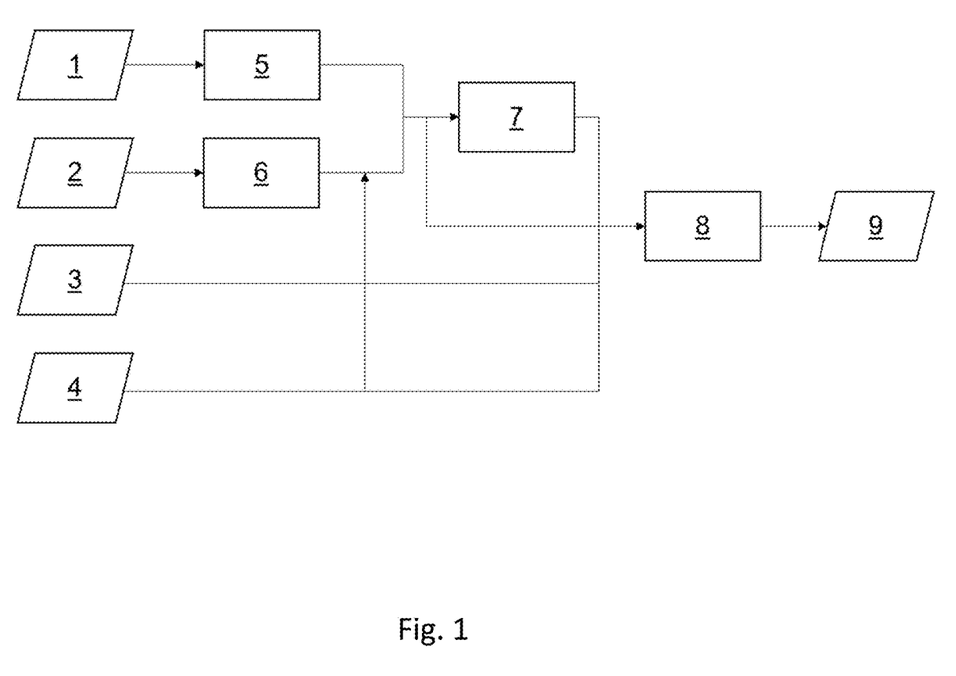
FIG. 1 shows a schematic depiction of an embodiment of the method according to the invention for determining a state $x_k$ of a localizing apparatus at a time $t_k$.

FIG. 1 shows a schematic depiction of an embodiment of the method according to the invention for determining a state $x_k$ of a localizing apparatus at a time $t_k$. The state $x_k$ may comprise a 3D position and a 3D orientation of the localizing apparatus at the time $t_k$. The 3D position and the 3D orientation may be expressed with respect to a world coordinate system. The state $x_k$ may additionally comprise 3D velocity information of the localizing apparatus at the time $t_k$, wherein said 3D velocity information may, e.g., also be expressed with respect to the world coordinate system. As the localizing apparatus may move through an indoor environment over time, its state may need to be tracked to determine current positions and orientations of the localizing apparatus.

At the time $t_k$, a first image 1 and a second image 2 of respective scenes of interest in the indoor environment are received, and a state estimate $\widehat{x_k}$ 3 of the localizing apparatus and positions n currently mapped SLAM landmarks 4 in the indoor environment are received as well. The schematic depiction shown in FIG. 1 may be seen as showing steps in an iteration of a larger modified SLAM algorithm. The method according to the invention which is schematically shown in FIG. 1 may be embedded into a larger tracking algorithm tracking both the state of the localizing apparatus over time and building up a representation of the environment through which the localizing apparatus moves over time. The larger modified SLAM algorithm may differ from a conventional SLAM algorithm in that the correction step involves updating of both state of the localizing apparatus and of previously determined SLAM landmark positions in at least one iteration of the larger modified SLAM algorithm using an image of pre-arranged landmarks with known positions in the indoor environment.

The first image 1 is an image of a scene of interest in the indoor environment comprising N pre-arranged landmarks. The positions (and possibly orientations) of the N pre-arranged landmarks in the indoor environment are known in a predefined world coordinate system. Since, at the time $t_k$, a first camera capturing the first image 1 has a specific position and orientation, not all the N pre-arranged landmarks may be in the field of view (i.e., visible) to the first camera. For example, J≤N pre-arranged landmarks may be visible to the first camera at the time $t_k$, which J pre-arranged landmarks are projected by the first camera onto the first image 1 of the scene of interest in the indoor environment. The projection of a pre-arranged landmark into an image may be termed a 'feature'. From the J pre-arranged landmarks projected onto the first image 1, M≤J features may be identified, and the 2D positions of those features in the image determined 5. The 2D position of a feature may, for example, be the 2D position of a centroid of said feature. Some of the J pre-arranged landmarks may be positioned and oriented to the first camera at the time $t_k$ in such a way that their projections into the image are too small/dim/badly detectable. In this case, M may be strictly smaller than J, i.e., M<J, and the remaining J−M pre-arranged landmarks which are projected by the first camera onto the first image 1 may be disregarded. It may also be assumed that the M features are features which correspond to pre-arranged landmarks, i.e., that outliers are removed. In general it is possible that more than N features are determined, for example due to outliers, and that among these determined features, M features actually corresponding to pre-arranged landmarks are present. These M features may be determined prior to the determining of an injective mapping estimate, or these M features may be determined during the determining of the injective mapping estimate. Among the determined features, more than M features actually corresponding to pre-arranged landmarks may be present: the M features may therefore also correspond to a proper subset of those features among the determined features actually corresponding to pre-arranged landmarks.

The SLAM features in the second image 2 are determined; more specifically the position of SLAM features in the second image 2 are determined. To determine 6 the positions of SLAM features in the second image 2, any SLAM feature detector known from the prior art may be used. Applying a SLAM feature detector to the second image 2 provides a list of L determined SLAM features with determined SLAM feature positions. Each determined SLAM feature corresponds to a SLAM landmark in a scene of interest in the indoor environment depicted in the second image. Since different SLAM feature detectors typically detect different SLAM features in the second image 2, SLAM landmarks depend on the choice of SLAM feature detector. In general, only m of the L determined SLAM features correspond to some of the n SLAM landmarks which have been observed in previous iterations.

An injective mapping estimate from the M features to the N pre-arranged landmarks is also determined 5. Since typically it holds that M<N, the injective mapping estimate is typically only injective and not surjective as well. The injective mapping estimate describes which pre-arranged landmark of the N pre-arranged landmarks induced which feature of the M features in the first image 1. To determine 5 such an injective mapping estimate, a current state of the first camera at the time $t_k$ may need to be known, wherein said current state of the first camera may be derived from a current state of the localizing apparatus to which the first camera may be attached. The injective mapping estimate may also be determined starting with all determined features, i.e., also including outliers. During the determining of the injective mapping estimate, outliers may be identified so that only M features corresponding to pre-arranged landmarks are mapped into the set of N pre-arranged landmarks. A SLAM injective mapping estimate from the m SLAM features to the n currently mapped SLAM landmarks may be determined 6 using feature signatures, for example, which identify individual SLAM features.

Using the determined injective mapping estimate and the determined SLAM injective mapping estimate, in a next step a joint observation model is set up 7. The joint observation model may be used 8 by an extended Kalman filter for performing the task of updating/correcting an output of a prediction step of the extended Kalman filter. The joint observation model is configured to map a map state random variable $s_k$, comprising (i) the current state of the localizing apparatus, (ii) the positions n currently mapped SLAM landmarks and (iii) the known positions of the N pre-arranged landmarks, onto a joint observation random variable statistically describing positions of features and SLAM features in the first image 1 resp. in the second image 2. Observations corresponding to a joint observation random variable are obtained through an actual measurement process, or through a computation carried out on data provided by an actual measurement process.

The joint observation model is part of a state-space model used for tracking a movement of the localizing apparatus through the scene of interest and for building up a SLAM landmark map of the scene of interest. Besides the joint observation model, the state-space model typically comprises a state-transition model (motion model) used in a prediction step. Alternatively to or in addition to a motion model, an inertial measurement unit may be used. In the present case, only the localizing apparatus may be assumed to move through the scene of interest, while both SLAM landmarks and pre-arranged landmarks may be assumed to be static over time (estimated positions of the SLAM landmarks are typically not static, however). The state-transition model describes how the state itself evolves over time. In case that the localizing apparatus is embodied as an aerial vehicle, for example, the state-transition model may comprise equations modelling the vehicle's flight, the equations potentially comprising control input used for controlling the vehicle's flight and a perturbation input. The joint observation model and/or the state-transition model may be linear or nonlinear in their input.

In case the joint observation model and the state-transition model are both linear, a Kalman filter may be used for determining 8 the state $x_k$ 9 at the time $t_k$, using at least the state estimate $\widehat{x_k}$ 3, the joint observation model and the observation 5,6, wherein the observation 5,6 is a realization of the joint observation random variable $z_k$. The observation 5,6 comprises (i) the 2D positions of the M features in the first image 1, and (ii) the 2D positions of the m SLAM features in the second image 2. In case the joint observation model and/or the state-transition model are nonlinear, an extended Kalman filter may be used, wherein the extended Kalman filter linearizes the nonlinear equations. Both Kalman filter and extended Kalman filter provide update equations/a correction step for updating the state estimate $\widehat{x_k}$ (specifically its mean vector and its covariance matrix) using the joint observation model and the measured observation. Once the state $x_k$ 9 has been determined 8, it may be propagated in time, e.g., from time $t_k$ to time $t_{k+1}$, using the state-transition model, the propagation in time providing a state estimate $\widehat{x_{k+1}}$ for the state of the localizing apparatus at the time $t_{k+1}$. Instead of Kalman filters, particle filters may be used, or state observers such as Luenberger observers may be used, or any other known filtering technique known from the state of the art. The state estimate $\widehat{x_{k+1}}$ may be taken as a new state estimate for determining the state $x_{k+1}$ at the time $t_{k+1}$.

The update equations of the Kalman filter or of the extended Kalman filter may be invoked at once for all M features and all m SLAM features, or separately for each feature of the M features and each SLAM feature of the m SLAM features, or at once for all M features and, separately, at once for all m SLAM features. In some embodiments of the method according to the invention, the update equations may only be invoked for those features out of the M features whose Mahalanobis distance to a predicted feature position, the predicted feature position, e.g., being determined based on the state estimate $\widehat{x_k}$ (or based on a state estimate of the localizing apparatus determined during the determining of the injective mapping estimate) and on the known positions of the N pre-arranged landmarks, is smaller than some threshold. In case an extended Kalman filter is used, a Jacobian of the joint observation model needs to be computed. In case the time $t_{k+1}-t_k$ between the capture of consecutive images is not long enough to process all M features and all m SLAM features, not all the (SLAM) features may be considered during the updating of the state.

Figure 2:
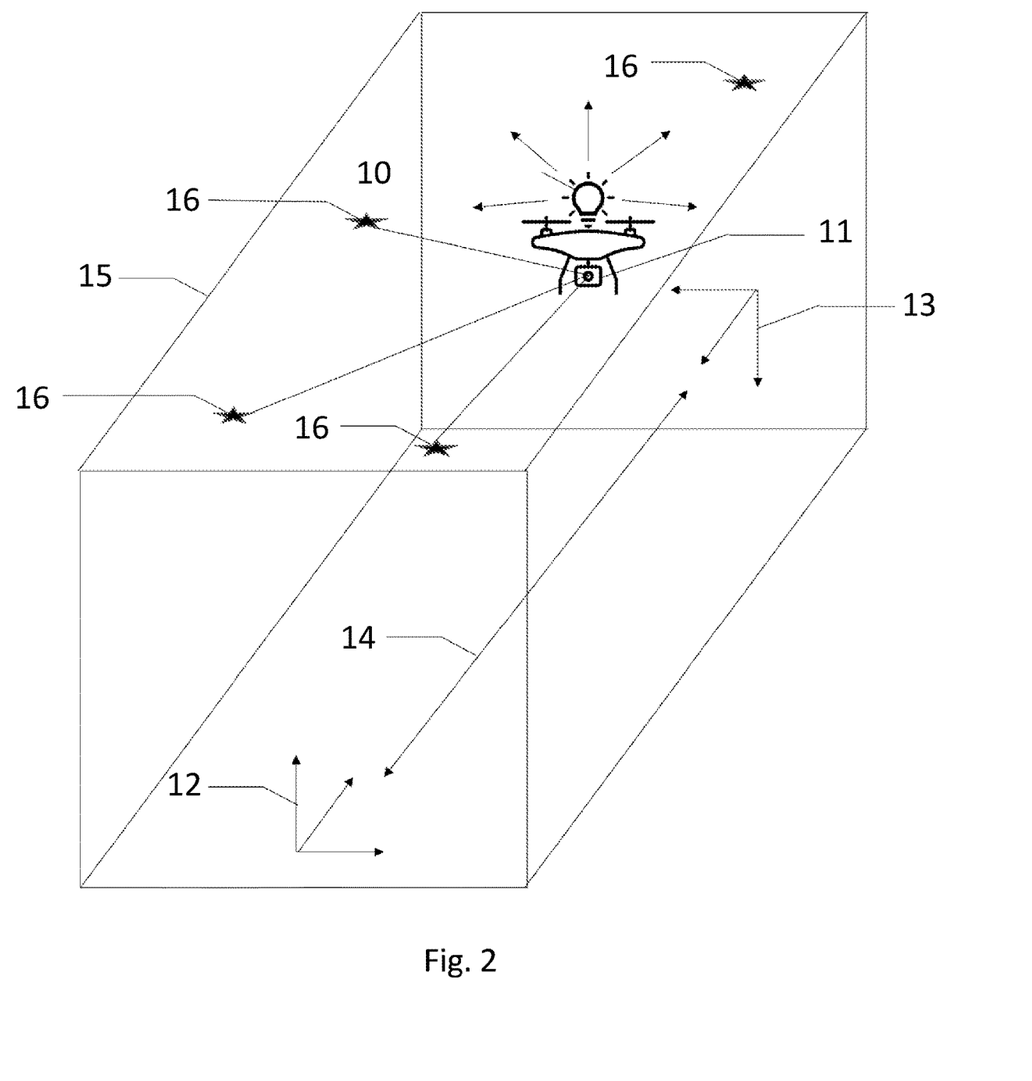
FIG. 2 shows a schematic depiction of a drone comprising a light source and a camera, wherein the drone is configured to fly in an indoor environment, wherein landmarks are arranged at a plurality of positions in said indoor environment.

FIG. 2 shows a schematic depiction of an aerial vehicle in the form of a drone, comprising a light source 10 and a first camera 11, wherein the drone is flying in an indoor environment 15, a scene of interest being present within the indoor environment. Pre-arranged landmarks 16, preferably each embodied as retroreflectors, are arranged at a plurality of positions within the indoor environment 15. The pre-arranged landmarks 16 may be mounted on a ceiling in the scene of interest 15. The pre-arranged landmarks may be embodied in substantially the same way, i.e., the pre-arranged landmarks may be fully fungible with respect to one another. At any given pose (comprising position and orientation) of the drone, some landmarks 16 may be visible to the first camera 11—in FIG. 2 indicated by lines between the pre-arranged landmarks 16 and the first camera 11—while other pre-arranged landmarks 16 may not be visible to the first camera 11. In FIG. 2, the first camera 11 is mounted below the drone. The first camera 11 may alternatively be mounted on a top of the drone in such a way that the camera is preferably arranged to point towards the ceiling so that the landmarks 16 which are located on the ceiling are visible to the first camera; the first camera may be located adjacent to the light source 10. Preferably the drone further comprises a second camera (not shown in FIG. 2). Preferably, the second camera is orthogonally oriented with respect to the first camera. Images captured by the second camera may be used as input to a SLAM algorithm.

The positions of the pre-arranged landmarks 16 may be known in a world coordinate system 12, and the current location of the drone may be expressed as a drone coordinate system 13, wherein a coordinate transformation 14 may be known between the world coordinate system 12 and the drone coordinate system 13. In case the first camera 11 and the light source 10 are fixed to the drone and their pose relative to the drone is known, the pose of the first camera 11 and of the light source 10 can be related to the world coordinate system 12 using the drone coordinate system 13. The current position of the drone can be determined using first image(s) of scene(s) of interest 15 in the indoor environment 15, specifically of the pre-arranged landmarks 16 having known positions, and using second image(s) of scene(s) of interest 15 in the indoor environment 15, which second image(s) may be used by a SLAM algorithm. Alternatively, or in addition, the drone may be equipped with an inertial measurement unit, which inertial measurement unit may be also used for pose determination of the drone. The light source 10 may be an isotropically emitting light source, or it may be a directional light source emitting in a non-isotropic manner. Light source 10 and first camera 11 are ideally close to each other, specifically in case the pre-arranged landmarks 16 are embodied as retroreflectors.

The invention claimed is:

1. Method for determining a state $x_k$ of a localizing apparatus at a time $t_k$, the state $x_k$ being a realization of a state random variable $x_k$, the method comprising:
   a) receiving a first image of a scene of interest in an indoor environment, wherein the indoor environment comprises N pre-arranged landmarks having known positions in a world coordinate system, N being a natural number;
   b) receiving a second image of the scene of interest in the indoor environment;
   c) receiving a state estimate $\widehat{x_k}$ of the localizing apparatus at the time $t_k$;
   d) receiving positions of n currently mapped simultaneous-localization-and-mapping (SLAM) landmarks in the scene of interest, wherein a map state $s_k$ comprises at least (i) the state $x_k$ of a localizing apparatus, (ii) the positions of the n currently mapped SLAM landmarks, and (iii) the positions of the N pre-arranged landmarks;
   e) determining positions of M features in the first image, M being a natural number smaller than or equal to N, and determining an injective mapping estimate from the M features into the set of N pre-arranged landmarks;
   f) determining positions of L SLAM features in the second image, and determining m SLAM features in the L SLAM features, wherein said m SLAM features are related to the n currently mapped SLAM landmarks, and determining a SLAM injective mapping estimate from the m SLAM features into the set of the n currently mapped SLAM landmarks;
   g) using the determined injective mapping estimate and the determined SLAM injective mapping estimate to set up a joint observation model as part of a state-space model, wherein the joint observation model is configured to map a map state random variable $s_k$ of which the map state $s_k$ is a realization onto a joint observation random variable $z_k$, wherein at the time $t_k$, an observation $z_k$ is a realization of the joint observation random variable $z_k$, and wherein the observation comprises the position of at least one of the M features in the first image and the position of at least one of the m SLAM features in the second image; and
   h) using (i) the state estimate $\widehat{x_k}$, (ii) the joint observation model, and (iii) the observation $z_k$, to determine the state $x_k$ of the localizing apparatus at the time $t_k$ and to update the positions of the n currently mapped SLAM landmarks.

2. Method according to claim 1, wherein the first image and the second image are captured at the time $t_k$.

3. Method according to claim 1, wherein the joint observation model comprises a first observation model describing the mapping of the at least one of the N pre-arranged landmarks, corresponding to the at least one of the M features via the injective mapping estimate, onto the position of the at least one of the M features, and wherein the joint observation model comprises a SLAM observation model describing the mapping of the at least one of the n currently mapped SLAM landmarks, corresponding to the at least one of the m SLAM features via the SLAM injective mapping estimate, onto the position of the at least one of the m SLAM features.

4. Method according to claim 1, wherein the injective mapping estimate, subsequently termed IME, links the M features with the M pre-assigned landmarks, and wherein the SLAM injective mapping estimate, subsequently termed SLAM-IME, links the m SLAM features with the m SLAM landmarks, wherein, for a feature i of the M features, the corresponding landmark is landmark IME(i), and wherein for a feature j of the m SLAM features, the corresponding SLAM landmark is SLAM landmark SLAM-IME(j), and wherein, for a feature-landmark pair (i,IME(i)) and for a SLAM feature/SLAM landmark pair (j,SLAM-IME(j)), the joint observation model links an observation random variable $z_{k,i}$ resp. $z_{k,j}$, wherein the joint observation random variable $z_k$ comprises the observation random variable $z_{k,i}$ (resp. $z_{k,j}$, to the state random variable $x_k$ and the position of landmark POS (IME(i)) resp. SLAM landmark POS (SLAM-IME(j),k):

$z_{k,i}=h_1(x_k, POS(IME(i)))$, i=1, ..., M, and $z_{k,j}=h_{SLAM}(x_k, POS(SLAM-IME(j), k))$, j=1, ..., m, wherein $h_1(\cdot)$ is the first observation model and $h_{SLAM}(\cdot)$ is the SLAM observation model.

5. Method according to claim 1, wherein the M features related to the N pre-arranged landmarks are substantially indistinguishable from one another, and wherein the indoor environment comprises K additional landmarks with a priori unknown positions in the world coordinate system, wherein H≤K additional landmarks of the K additional landmarks are in the scene of interest and wherein currently estimated positions of P of the K additional landmarks are part of the map state $s_k$, and wherein the H additional landmarks are captured in the first image as additional features which are substantially indistinguishable from the M features, wherein the method additionally comprises the following: 1) determining, jointly with the determining of the positions of the M features, positions of the H additional features, wherein the determining thereby provides M+H positions of the features and of the additional features in the first image; 2) separating the positions of the M+H features and additional features into a first set comprising M+R positions, with R≤P, and into a second set comprising Q positions, with H=R+Q; 3) determining the injective mapping estimate from the first set into an indistinguishable landmark set comprising the positions of the N pre-arranged landmarks and the P currently estimated positions; and 4) updating the map state s; based on the second set.

6. Method according to claim 5, wherein the first image is captured by a first camera with a first camera center and a first image sensor, wherein a first camera center position in the world coordinate system is determined based on the state estimate $\hat{x}_k^-$, and wherein the separating proceeds by carrying out the following steps for each element in the set of M+H positions, the M+H positions being 2D positions measured in a coordinate system of the first image sensor: (i) determining a ray having as initial point the first camera center and as further point a 3D position corresponding to the 2D position of the respective element, wherein the 3D position is determined based on the state estimate $\hat{x}_k^-$ and a known spatial relationship between the localizing apparatus and the first image sensor, and (ii) assigning the respective element to the first set if any landmark in the indistinguishable landmark set, measured by way of orthogonal projection onto the respective ray, is closer to the respective ray than a pre-set distance threshold, and otherwise assigning the respective element to the second set.

7. Method according to claim 5, wherein the observation additionally comprises the position of at least one of the R additional features in the first image, and wherein together with the updating of the positions of the n currently mapped SLAM landmarks the P currently estimated positions of additional landmarks are updated.

8. Method according to claim 7, wherein the first observation model additionally describes the mapping of the at least one of the R additional landmarks, corresponding to the at least one of the R additional features via the injective mapping estimate, onto the position of the at least one of the R additional features.

9. Method according to claim 1, wherein the determining of the state $x_k$ using (i) the state estimate $\hat{x}_k^-$, (ii) the joint observation model, and (iii) the observation $z_k$, is done by using update equations provided by applying an extended Kalman filter to the state-space model, wherein the update equations comprise the Jacobian matrix of the joint observation model, wherein the Jacobian matrix of the first observation model is evaluated at the state estimate $\hat{x}_k^-$, and wherein the Jacobian matrix of the SLAM observation model is evaluated at at least the state estimate $\hat{x}_k^-$ and at the positions of the n currently mapped SLAM landmarks.

10. Method according to claim 9, wherein the update equations corresponding to all M features and all m SLAM features are consecutively and independently invoked.

11. Method according to claim 1, wherein the first image is captured by the first camera as a light source is operated to emit light which illuminates the scene of interest.

12. A non-transitory computer program product comprising instructions which when executed by a computer, cause the computer to carry out a method according to claim 1.

13. Assembly, comprising (a) a localizing apparatus, (b) a first camera arranged on the localizing apparatus, (c) a plurality of pre-arranged landmarks in an indoor environment, and (d) a controller, wherein the controller is configured to carry out a method according to claim 1.

14. Assembly according to claim 13, further comprising a second camera arranged on the localizing apparatus, wherein the first camera is arranged on the localizing apparatus in such a way that a ceiling of the indoor environment is in the field of view of the first camera, wherein a camera axis of the first camera is in the first camera's field of view, and the second camera is arranged on the localizing apparatus in such a way that the second camera's camera axis is substantially orthogonal to the camera axis of the first camera.

15. Assembly according to claim 13, further comprising a light source, wherein the light source is arranged on the localizing apparatus, and/or at least one additional landmark.

* * * * *